(12) United States Patent
Cahill et al.

(10) Patent No.: US 8,528,987 B2
(45) Date of Patent: Sep. 10, 2013

(54) LINEAR SEAT BELT PRETENSIONER

(75) Inventors: Timothy J. Cahill, Dryden, MI (US); Jon E. Burrow, Ortonville, MI (US)

(73) Assignee: Autoliv ASP, Inc., Ogden, UT (US)

( * ) Notice: Subject to any disclaimer, the term of this patent is extended or adjusted under 35 U.S.C. 154(b) by 77 days.

(21) Appl. No.: 13/361,206

(22) Filed: Jan. 30, 2012

(65) Prior Publication Data

US 2013/0193741 A1    Aug. 1, 2013

(51) Int. Cl.
    *B60R 22/28*            (2006.01)
    *A62B 35/04*           (2006.01)

(52) U.S. Cl.
    USPC ........................................................ 297/480

(58) Field of Classification Search
    USPC ........................................................ 297/480
    See application file for complete search history.

(56) References Cited

U.S. PATENT DOCUMENTS

| | | | |
|---|---|---|---|
| 2,319,557 A | 5/1943 | Ritz-Woller |
| 3,891,271 A | 6/1975 | Fieni |
| 3,901,531 A | 8/1975 | Prochazka |
| 4,288,098 A | 9/1981 | Tsuge et al. |
| 4,508,287 A | 4/1985 | Nilsson |
| 4,917,210 A | 4/1990 | Danicek et al. |
| 5,149,135 A | 9/1992 | Konishi et al. |
| 5,294,150 A | 3/1994 | Steffens, Jr. |
| 5,366,245 A | 11/1994 | Lane, Jr. |
| 5,374,110 A | 12/1994 | Hiramatsu |
| 5,516,148 A | 5/1996 | Ohira |
| 5,519,997 A | 5/1996 | Specht |
| 5,553,890 A | 9/1996 | B uhr et al. |
| 5,588,608 A | 12/1996 | Imai et al. |
| 5,671,949 A | 9/1997 | Bauer et al. |
| 5,676,397 A | 10/1997 | Bauer |
| 5,704,099 A | 1/1998 | Cahill |
| 5,911,440 A | 6/1999 | Ruddick et al. |
| 5,967,440 A | 10/1999 | Marshall |
| 5,971,488 A | 10/1999 | Pedronno et al. |

(Continued)

FOREIGN PATENT DOCUMENTS

| | | |
|---|---|---|
| DE | 103 08 121 B3 | 10/2004 |
| EP | 0 625 450 A2 | 11/1994 |

(Continued)

OTHER PUBLICATIONS

U.S. Appl. No. 12/723,151, filed Mar. 12, 2010, Lane, Jr. et al.

(Continued)

*Primary Examiner* — Rodney B White
(74) *Attorney, Agent, or Firm* — Brinks Hofer Gilson & Lione

(57) ABSTRACT

A linear seat belt pretensioner (10, 110, 210) has a frame (12; 112, 113; 212, 213) and an axial cavity (24, 60; 124, 160; 232) rigidly connected to the frame (12; 112, 113; 212, 213), a gas generator (20, 120, 220) in fluid communication with the axial cavity (24, 60; 124, 160, 232), and a piston (40, 140, 240) movably arranged in the axial cavity (24, 60; 124, 160; 232). An actuating profile (42, 142, 242) movable with the piston (40, 140) pulls a length of seat belt webbing (38, 238) into the frame (12; 112, 113; 212, 213) that corresponds to twice the piston stroke (D). The pretensioner device having a locking ramp arrangement (66, 70; 266, 290, 292) configured to form a one-way clutch allowing an increase and resisting a reduction of the length of belt webbing (38, 238) received by the pretensioner (10, 110, 210).

15 Claims, 6 Drawing Sheets

(56) References Cited

U.S. PATENT DOCUMENTS

| | | |
|---|---|---|
| 6,068,664 A | 5/2000 | Meyer et al. |
| 6,131,951 A | 10/2000 | Chicken et al. |
| 6,149,095 A | 11/2000 | Specht et al. |
| 6,155,512 A | 12/2000 | Specht et al. |
| 6,186,549 B1 | 2/2001 | Specht et al. |
| 6,299,090 B1 | 10/2001 | Specht et al. |
| 6,340,176 B1 | 1/2002 | Webber et al. |
| 6,364,239 B1 | 4/2002 | Jallot et al. |
| 6,382,674 B1 | 5/2002 | Specht et al. |
| 6,419,271 B1 | 7/2002 | Yamada et al. |
| 6,450,435 B2 | 9/2002 | Junker et al. |
| 6,454,306 B1 | 9/2002 | Cunningham et al. |
| 6,516,726 B2 | 2/2003 | Specht |
| 6,527,298 B2 | 3/2003 | Kopetzky |
| 6,527,299 B2 | 3/2003 | Specht et al. |
| 6,561,936 B1 | 5/2003 | Betz et al. |
| 6,626,463 B1 | 9/2003 | Arima et al. |
| 6,682,097 B2 | 1/2004 | Krauss et al. |
| 6,702,327 B2 | 3/2004 | Janz |
| 6,712,394 B2 | 3/2004 | Betz et al. |
| 6,820,310 B2 | 11/2004 | Woodard et al. |
| 6,840,544 B2 * | 1/2005 | Prentkowski ............ 297/480 X |
| 6,902,195 B2 | 6/2005 | Ball et al. |
| 6,936,303 B1 | 8/2005 | Katsuda et al. |
| 7,118,133 B2 | 10/2006 | Bell et al. |
| 7,131,669 B2 | 11/2006 | Morita et al. |
| 7,172,218 B2 | 2/2007 | Nakano et al. |
| 7,188,868 B2 | 3/2007 | Yamaguchi |
| 7,338,083 B2 | 3/2008 | Sakata |
| 7,350,734 B2 | 4/2008 | Stevens |
| 7,380,832 B2 | 6/2008 | Gray et al. |
| 7,490,857 B2 | 2/2009 | Tomita |
| 7,533,902 B2 | 5/2009 | Arnold et al. |
| 7,631,900 B2 | 12/2009 | Nakayama et al. |
| 7,644,952 B2 | 1/2010 | Holtz et al. |
| 7,823,924 B2 | 11/2010 | Dewey et al. |
| 8,132,829 B2 * | 3/2012 | Sugiyama et al. ......... 297/480 X |
| 8,196,962 B2 * | 6/2012 | Sugiyama et al. ......... 297/480 X |
| 2002/0030396 A1 | 3/2002 | Stevens |
| 2002/0043796 A1 | 4/2002 | Webber et al. |
| 2002/0088890 A1 | 7/2002 | Shih et al. |
| 2003/0029661 A1 | 2/2003 | Motozawa |
| 2003/0184076 A1 | 10/2003 | Devereaux et al. |
| 2004/0046382 A1 | 3/2004 | Ball et al. |
| 2006/0087108 A1 | 4/2006 | Midorikawa |
| 2006/0118347 A1 | 6/2006 | Zelmer et al. |
| 2006/0213191 A1 | 9/2006 | Borg et al. |
| 2006/0279077 A1 | 12/2006 | Nakano et al. |
| 2007/0013186 A1 | 1/2007 | Bell |
| 2007/0024045 A1 | 2/2007 | Zelmer et al. |
| 2007/0029774 A1 | 2/2007 | Kuroki |
| 2007/0194565 A1 | 8/2007 | Clute |
| 2009/0218802 A1 | 9/2009 | Singer et al. |
| 2010/0032967 A1 | 2/2010 | Otsuka |
| 2010/0037610 A1 | 2/2010 | Singer |
| 2011/0012418 A1 | 1/2011 | Mages |
| 2011/0068614 A1 * | 3/2011 | Sugiyama et al. ............ 297/480 |

FOREIGN PATENT DOCUMENTS

| | | |
|---|---|---|
| EP | 0 685 371 B1 | 7/1997 |
| EP | 1 078 827 A2 | 2/2001 |
| FR | 2 721 073 | 12/1995 |
| JP | 11-321559 | 11/1999 |
| WO | WO 02/062632 A1 | 8/2002 |

OTHER PUBLICATIONS

U.S. Appl. No. 12/826,089, filed Jun. 29, 2010, Lane, Jr.
PCT International Search Report—Jan. 30, 2013.

* cited by examiner

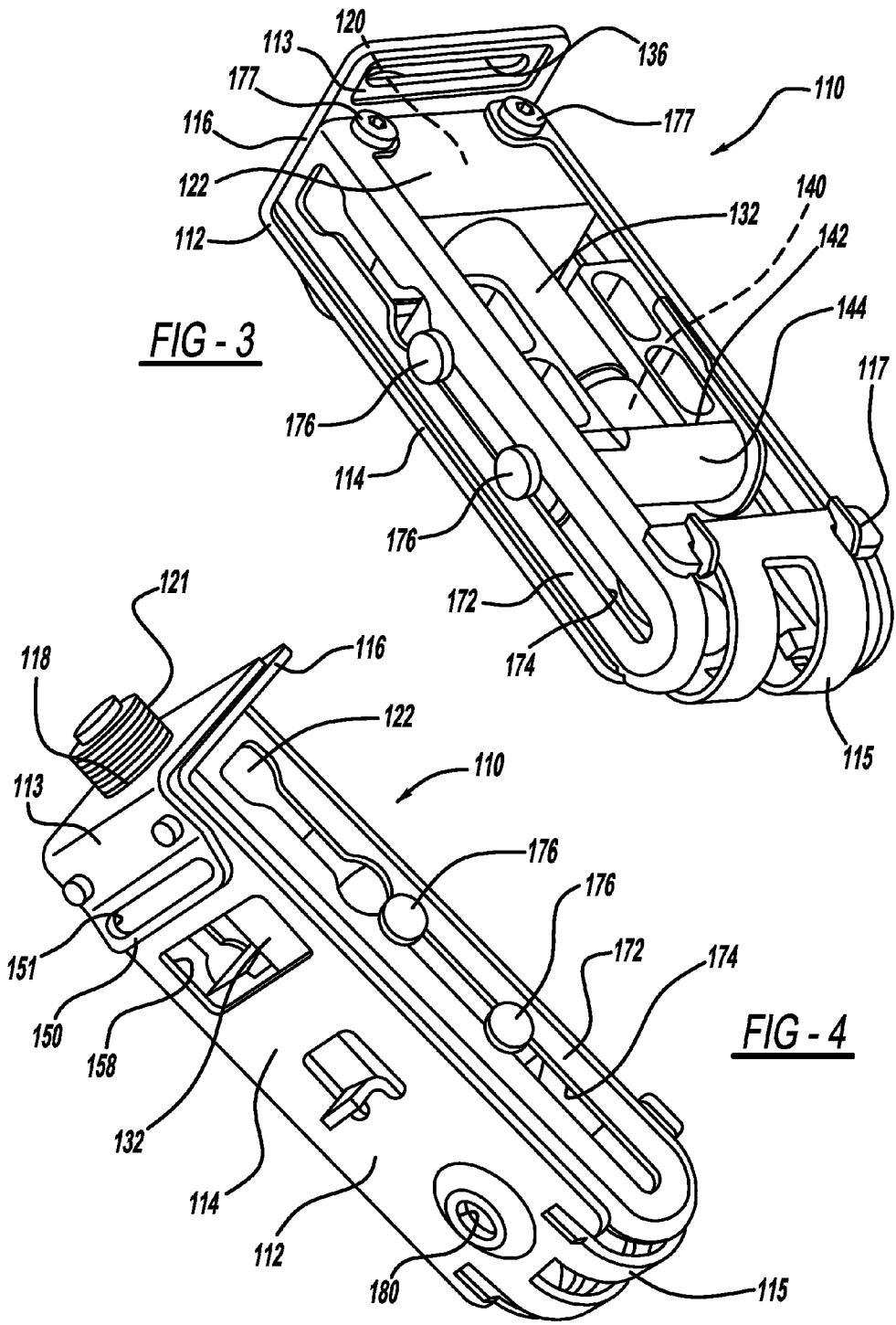

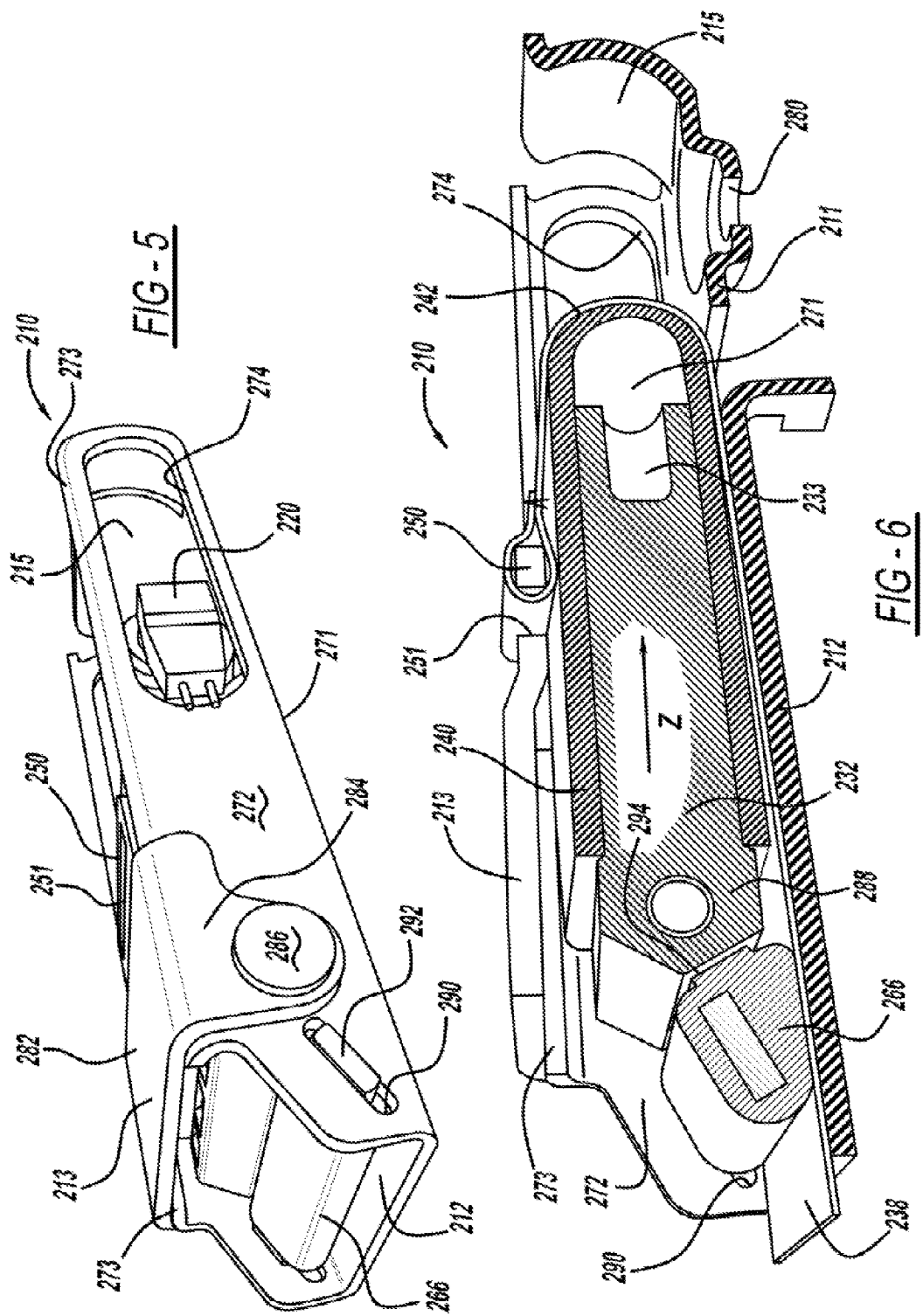

LINEAR SEAT BELT PRETENSIONER

FIELD OF THE INVENTION

The present invention relates generally to seatbelt restraint systems for motor vehicles, and more particularly, to a linear seatbelt pretensioner for a seatbelt restraint system.

BACKGROUND OF THE INVENTION

Seatbelt restraint systems for restraining an occupant in a vehicle seat play an important role in reducing occupant injury in vehicle crash situations. Seatbelt restraint systems of the conventional so-called "3-point" variety commonly have a lap belt section extending across the seat occupant's pelvis and a shoulder belt section crossing the upper torso, which are fastened together or are formed by a continuous length of seatbelt webbing. The lap and shoulder belt sections are connected to the vehicle structure by anchorages. A belt retractor is typically provided to store belt webbing and may further act to manage belt tension loads in a crash situation.

Seatbelt restraint systems which are manually deployed by the occupant (so-called "active" types) also typically include a buckle attached to the vehicle body structure by an anchorage. A latch plate attached to the belt webbing is received by the buckle to allow the belt system to be fastened for enabling restraint, and unfastened to allow entrance and egress from the vehicle. Seatbelt systems, when deployed, effectively restrain the occupant during a collision.

Some seatbelt restraint systems include pretensioning devices, which tension the seatbelt either prior to impact of the vehicle (also known as a "pre-pretensioner") or at an early stage of a sensed impact to enhance occupant restraint performance. The pretensioner takes out slack in the webbing and permits the belt restraint system to couple with the occupant early in the crash sequence. Upon the detection of a condition leading to an imminent impact or rollover, or in the event of an actual rollover, seat belt webbing is automatically and forcibly retracted by the pretensioner to tighten the seat belt against the occupant.

One type of pretensioning device is a pyrotechnic linear pretensioner (PLP), which can be implemented as a pyrotechnic buckle pretensioner (PBP) that is attached to a seat belt buckle. PLPs can also be attached to a webbing guide loop or seatbelt anchorage. Since both types pull a seat belt system component linearly to apply tension in the belt webbing, both PLPs and PBPs can be collectively referred to as PLPs. Examples of designs of PLPs and PBPs are provided by U.S. Pat. Nos. 6,068,664 and 7,823,924, which are hereby incorporated by reference. Typical PLPs have a pyrotechnic charge that is fired when a collision occurs, producing expanding gas which pressurizes a gas chamber within a tube, which forces a piston down the tube. The piston is connected with the belt system by a cable or strap. Stroking of the piston tightens or "pretensions" the belt against the occupant.

One limitation of known PLP designs in which the piston stroke shortens a cable attached to one end of seatbelt webbing is that this configuration limits the PLP mounting location to the side of the seatbelt buckle because the other end of the seatbelt is rolled up on a spool.

Also, in order to retract the cable, the cable is connected to the piston and is pulled into the expanding gas chamber. Sealing the gas chamber around the flexible cable presents a difficult challenge. Pulling the cable past the seal generates friction that needs to be compensated with a greater pull force. Also, the location at which the cable enters the gas chamber creates a potential pressure leak path. The gas escaping from the device into the vehicle passenger compartment may lead to reduced efficiency of the pretensioner and may contain combustion products that may negatively affect seat occupants.

These shortcomings are typically compensated by using gas generators producing a greater gas volume to ensure a piston stroke sufficient to remove the slack in the seat belt. The gas chamber needs to be long enough for the piston to move by the distance that corresponds to the slack in the seat belt. All these properties of existing linear pretensioner devices make PLPs rather large and complex.

SUMMARY OF THE INVENTION

It is an object of the present invention to reduce leak paths from a PLP. It is further an object of the present invention to provide a simplified, reliable, cost-effective PLP with fewer parts. It is yet another object of the present invention to provide a PLP that can be installed at various locations along the path of a seat belt depending on packaging conditions of a given vehicle.

The present invention provides a PLP that substantially reduces leak paths for gas to escape from the PLP device by eliminating a cable affixed to the piston that enters the gas chamber. The present invention also reduces the stroke distance needed for the piston by effecting a shortening of the seat belt by twice the distance of the piston stroke. Furthermore, the PLP of the present invention can be mounted in various locations along a path of the seat belt because it acts directly on the belt webbing and not on a cable or a belt anchorage.

The pretensioner of the present invention has a piston sealingly guided inside a cylinder. The piston extends outward from the cylinder and is connected to an actuating profile that acts directly on the belt webbing. The belt webbing led around the actuating profile so that the belt webbing is shortened by a distance corresponding to twice the distance of the piston stroke.

Once the seat belt is tensioned, a one-way clutch operating with balls being wedged between a conical ramp formed on the piston and the wall of the cylinder prevents that the piston returns to a retracted position.

Additional details and advantages of the present invention become apparent to those skilled in the art of the present invention from the following description and the appended claims, in connection with the accompanying drawings of exemplary embodiments. It should be understood that the description and specific examples are intended for purposes of illustration only and are not intended to limit the scope of this invention.

BRIEF DESCRIPTION OF THE DRAWINGS

In the drawings,

FIG. 3 shows a perspective view of a second exemplary embodiment of a PLP according to the present invention to illustrate packaging and size;

FIG. 4 shows a different perspective view of the PLP of FIG. 3;

FIG. 5 shows a third exemplary embodiment of a PLP according to the present invention in a perspective view;

FIG. 6 shows a cross-sectional view of the PLP of FIG. 5;

DETAILED DESCRIPTION OF THE DRAWINGS

The following description is merely exemplary in nature and is not intended to limit the present disclosure or its application or uses.

Figure 1:
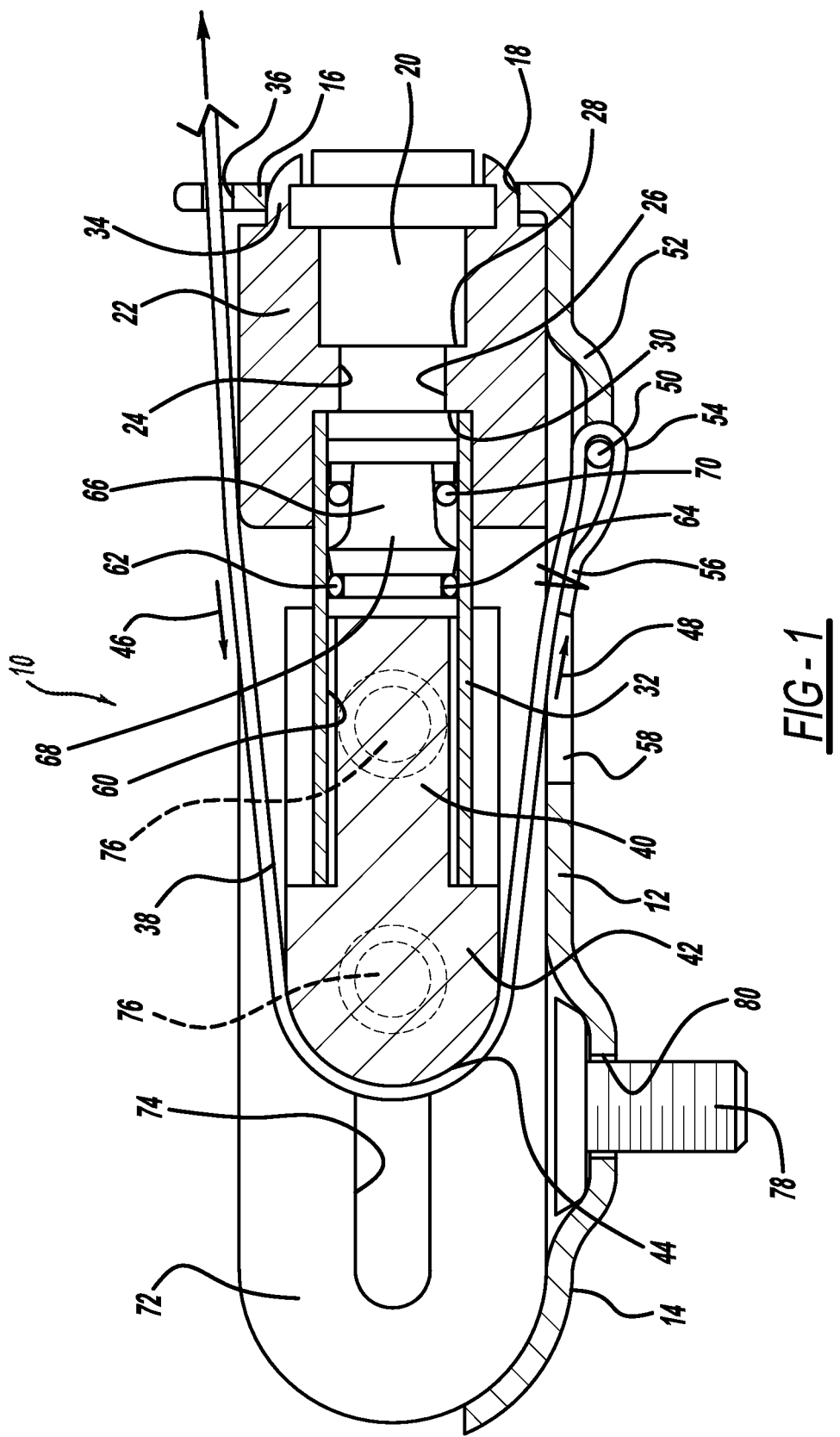
FIG. 1 is a schematic cross-sectional view of a first exemplary embodiment of a PLP according to the present invention in a normal state before deployment.
Figure 2:
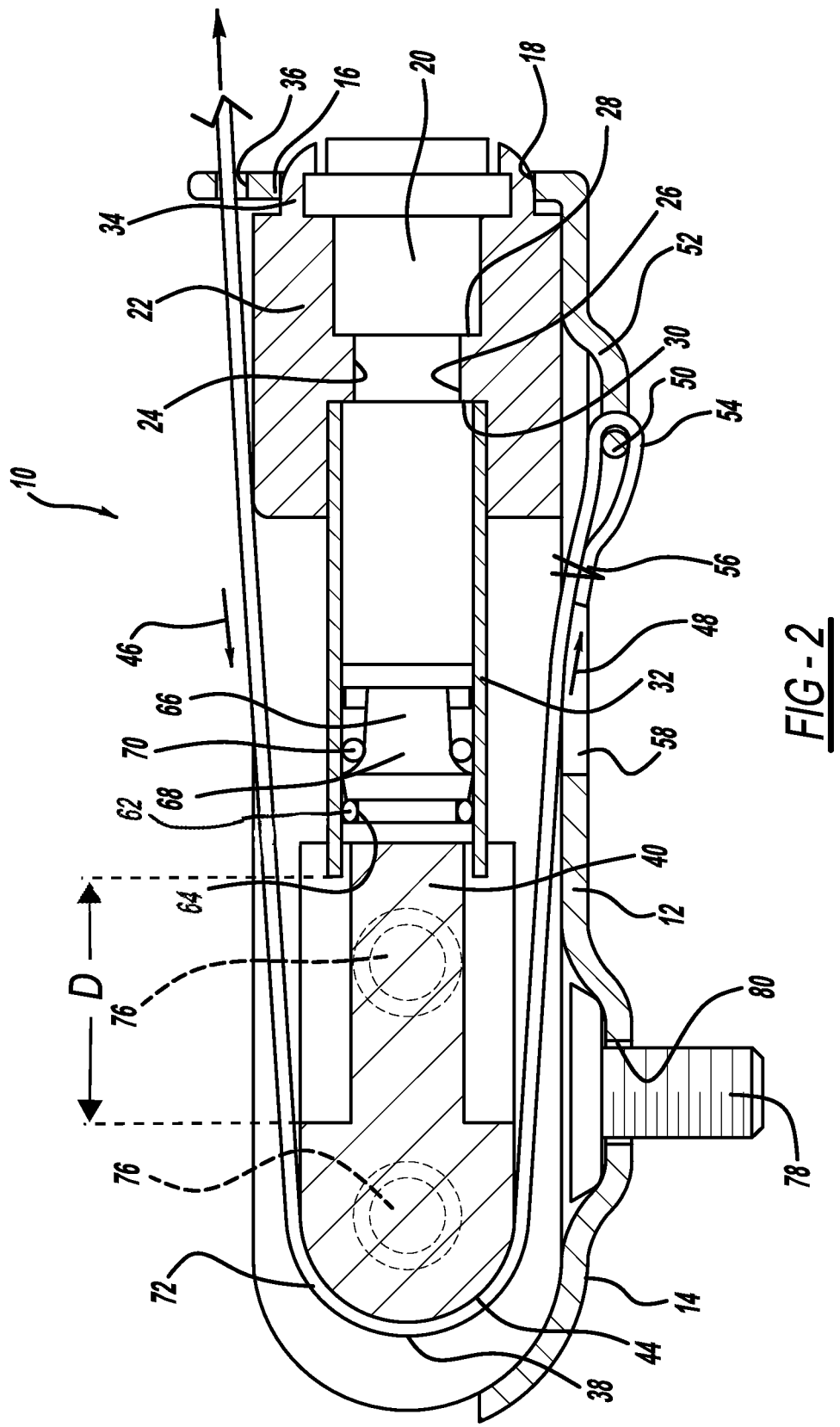
FIG. 2 shows the same cross-sectional view of the PLP of FIG. 1 after deployment.
Figure 7:
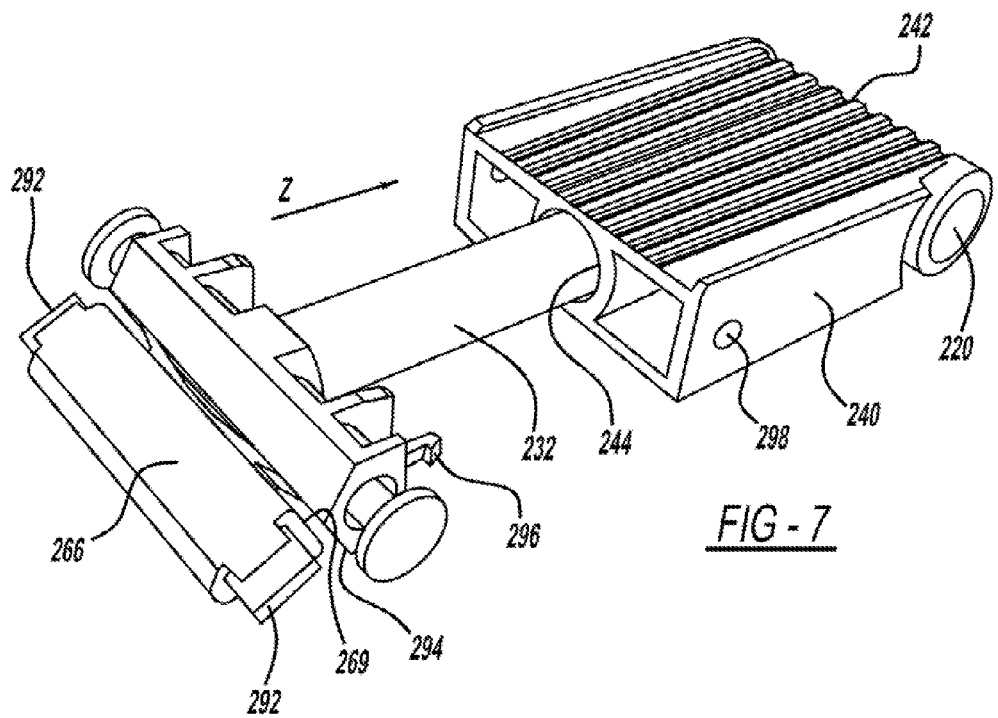
FIG. 7 shows a perspective view of the interior parts of the PLP of FIG. 5 after deployment.
Figure 8:
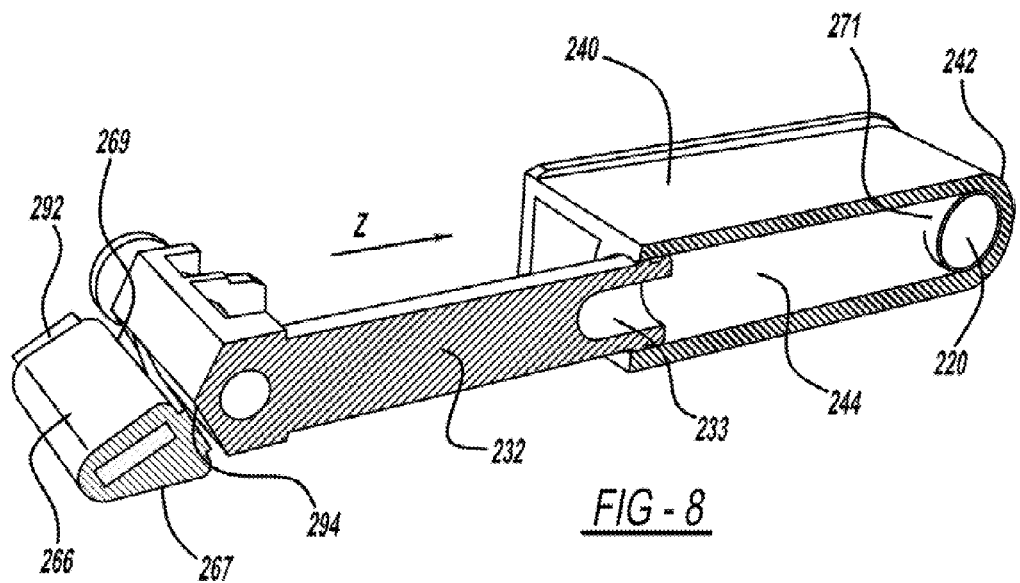
FIG. 8 shows a cross-sectional view of the interior parts of the PLP of FIG. 5 after deployment.

FIGS. 1 and 2 show a schematic structure of a pretensioner device 10 according to a first exemplary embodiment of the present invention. Referring to FIG. 1, the pretensioner device 10 will be described in the following using cylindrical coordinates and has an axis of operation Z designating the axial direction of the coordinates. The pretensioner device 10 has a base plate 12 formed of sheet metal. The base plate 12 has a profile that is approximately L-shaped with a long leg 14 extending in the axial direction and a short leg 16 extending in the radial direction. An axial central opening 18 is located in the short leg 16 of the base plate 12. The axial central opening 18 is circular and allows to insert a gas generator 20 into a block 22. The block 22 has a substantially cylindrical shape with a central axial bore 24 that has its narrowest diameter in a central axial section 26. Toward the axial ends of the block 22, the bore 24 has a first widening step 28 that accommodates a portion of the gas generator 20. A second widening step 30 in block 22 opposite the first widening step serves as an abutment for a hollow cylinder 32 that is press-fitted into the bore 24. The block 22 has an axial collar 34 that is bent radially inward after insertion of the gas generator 20 by caulking or crimping. The collar 34 establishes a seal to the outside and a positive axial lock securing the gas generator 20 against slipping out of block 22.

The cylinder 32 accommodates a plunger piston 40 that is configured to slide out of the cylinder 32 away from the gas generator 20. The piston 40 extends over most of the length of the cylinder 32 and protrudes from the cylinder 32 with an enlarged actuating profile 42 with an essentially semi-cylindrical end surface 44 having a cylindrical axis extending in the radial direction of the pretensioner device 10. The shape of the actuating profile 42 is visible in greater detail in FIG. 3.

The actuating profile 42 deflects a seat belt webbing 38 by an angle in a range of 160° to 180° between a first, incoming direction 46 and a second, deflected direction 48 of the seat belt webbing 38. The seat belt webbing 38 enters the pretensioner device 10 in the first direction 46 through the slot 36, is guided around the actuating profile 42 and then led back in the second direction 48, nearly opposite the first direction 46. Near the connection of the short leg 16 and the long leg 14, the seat belt webbing 38 is fastened to an attachment bar 50 extending in a tangential direction and formed on a tongue 52 of the long leg 14 of the base plate 12. The seat belt webbing 38 is secured to the attachment bar 50 with a loop 54 formed by an end 56 of the seat belt webbing 38 that has been folded back and sewn to the seat belt webbing 38.

The tongue 52 is a piece of the base plate 12 that has been bent slightly radially outward, giving way to a window 58 in the base plate 12 for guiding the seat belt webbing 38 from the actuating profile to the attachment bar 50.

Inside the hollow cylinder 32, the piston 40 is sealed against the interior cylinder wall 60 with an elastomeric O-ring 62 embedded in an annular groove 64 of the piston 40. Between the O-ring 62 and the gas generator 20, the piston is shaped like a truncated cone forming a ball ramp 66 with a flared cone base 68 adjacent to the annular groove 64 and tapered toward the gas generator 20. Between the ball ramp 66 and the cylinder wall 60, a plurality of balls 70 is arranged around the circumference of the ball ramp 66. The balls 70 have a size that is dimensioned to allow an axial movement of the balls 70 in an axial area of the ball ramp 66 proximate the gas generator 20, but to cause the balls 70 to be jammed between the cylinder wall 60 and the cone base 68 upon a force acting on piston 40, urging it to move in the retraction direction.

For guiding the piston 40 in the axial direction Z, the pretensioner device 10 has a pair of guide rails 72 extending in the axial direction perpendicular to the base plate 12 and affixed to the base plate 12 on opposite sides thereof, thereby forming a frame consisting of the base plate 12 and the guide rails 72. Each of the guide rails 72 has an axial guide slot 74 configured to guide sliding knobs 76 (indicated by broken lines) formed on the radially outer sides of the actuating profile 42.

An anchor bolt 78 for mounting the pretensioner device 10 in a vehicle is guided through a mounting hole 80 in the long leg 14 of the base plate 12 between the window 58 and the end 82 of the long leg 14. The mounting location of the pretensioner device 10 is adaptable to packaging conditions inside the vehicle. Especially if the belt webbing 38 is not fastened to the attachment bar 50, but guided around the attachment bar, the pretensioner device 10 can be installed in any location along the course of a seat belt where the seat belt webbing extends near a vehicle wall or floor. By guiding the seat belt webbing into and out of the pretensioner device 10, the pretensioner device is not limited to a mounting location at the end 56 of the seat belt webbing 38.

The shown embodiment uses the block 22 and the cylinder 32 to form a pretensioner body with an axial cavity consisting of the bore 24 and the interior of the cylinder 32. These two parts are replaceable by a one-piece body without leaving the scope of the present invention.

FIG. 1 shows the pretensioner device 10 in a normal state. The pretensioner device 10 is permanently in the normal state upon installation, unless a trigger event occurs. A trigger event is a sudden deceleration or external impact that causes an electrical signal to be sent to the gas generator 20, causing the gas generator 20 to deploy and to release expansion gas into the bore 24.

FIG. 2 shows the pretensioner device 10 of FIG. 1 after deployment of the gas generator 20. Because the expansion gas released by the gas generator 20 has increased the gas pressure in the bore 24, the piston 40 has moved axially outward from the cylinder 32, away from the gas generator 20. This axial movement of the piston 40 is opposed by a pull force P or resistance of the belt webbing. At some point, the opposing force P on the piston may be so strong that the piston 40 is unable to pull more of the seat belt webbing in the direction 46. Absent such a pull force P or resistance, the piston 40 stops moving when one of the sliding knobs 76 reaches the end of the guide slot 74. This signifies the maximum possible stroke D of the piston 40. After the piston 40 has traveled the distance D, the seat belt webbing 38 has been pulled through slot 36 by a length corresponding to approximately twice the distance D because the seat belt webbing 38 lines the piston 40 on two sides that are radially opposed. If the piston has only traveled a portion of the distance D, the length of seat belt webbing that has been pulled through slot 36 amounts to approximately twice that portion.

During the axial movement out of the cylinder 32, the balls 70 have moved along with the piston 40. When now the pull force P acts on the seat belt webbing 38 opposite to the direction 46, the cone base 68 of the ball ramp 66 moves between the balls 70 and jams the balls 70 between the ball ramp 66 and the cylinder wall 60. Through this interaction, the ball ramp 66 and the balls 70 form a one-way clutch stopping any further reverse movement of the piston 40 toward the gas generator 20. The one-way clutch ensures that the pretensioning action on the seat belt webbing 38 is maintained.

Referring now to FIGS. 3 and 4, a second embodiment of a pretensioner device 110 is shown. The function of this second embodiment is identical to the function of the embodiment shown in FIGS. 1 and 2, and parts corresponding to elements of FIGS. 1 and 2 bear reference numerals raised by 100.

The pretensioner device 110 has a base plate 112 that, in addition to a long leg 114 and a short leg 116, also has a U-shaped extension 115 bent around the axial ends of guide rails 172 and interlocked therewith by corresponding noses 117 formed on the guide rails 172 and on the extension 115. The U-shaped extension 115 may provide a stop for an end surface 144 of an actuating profile 142 connected to a piston 140.

The guide rails 172 have guide slots 174 with a locally widened width for inserting sliding knobs 176 formed on the actuating profile 142. Depending on the final dimensions of the device 110, the length of the guide slots 174 or the position of the extension 115 or both may determine the position in which the piston 140 cannot move any further.

In the present embodiment, the base plate 112 is reinforced by a backing plate 113. A slot 136 penetrates both the base plate 112 and the backing plate 113, and an attachment bar 150 is formed on the backing plate 113 adjacent to a window 158 in the base plate 112. Like the previous embodiment, the pretensioner device of FIGS. 3 and 4 has an open frame. Here, the frame consists of the base plate 112, the guide rails 172 and the backing plate 113.

A machined block 122 is inserted between the guide rails 172. The guide rails 172 are screwed onto the block 122 with rivets or bolts 177. Likewise, the base plate and the backing plate are also affixed to the block 122. A cylinder 132 is press-fitted into the block 122.

In the drawings of FIGS. 3 and 4, the piston 140 is not visible because it is concealed by the cylinder 132. The actuating profile 144 may be formed on the piston 140 or a separate part connected to the piston 140.

Not shown is any seat belt webbing in order to reveal the interior arrangement of elements inside the pretensioner device 110. The installation of seat belt webbing into the pretensioner device 110 is analogous to the embodiment of FIGS. 1 and 2. Passing through the slot 136, the webbing is guided around the end surface 144 of the actuating profile 142. From the end surface 144, the webbing is then threaded through the window 154 to be fastened to the attachment bar 150. Alternatively, the seat belt webbing may be guided through a slot 151 formed by the attachment bar 150 to be fastened to a different part of the vehicle. The attachment bar 150 or the slot 151 between the attachment bar 150 and the backing plate 113 on one side and the slot 136 on the other side form a guide arrangement for the belt webbing. The length of the seat belt webbing 238 received by the guide arrangement increases upon deployment of the gas generator 120.

The base plate 112 is shown with a mounting hole 180 for anchoring the pretensioner device in the vehicle. In FIGS. 3 and 4, it is shown without an anchor bolt.

In block 122, a gas generator 120 is inserted that has a threaded end piece 121 protruding through an axial central opening 118 in the base plate 114 and the backing plate 113. The gas generator 120 can be secured to the base plate 112 and to the backing plate 113 by a nut (not shown) screwed onto the threaded end piece 121.

FIGS. 5 through 10 show a third exemplary embodiment of a linear pretensioner device 210 according to the present invention. Where applicable, reference numbers have been increased by 200 relative to those of FIGS. 1 and 2 for functionally equivalent elements.

The pretensioner device 210 will be described in the following in a synopsis of FIGS. 5 through 8. The pretensioner device 210 has a frame 211 that integrally forms a base plate 212, two side rails 272 and an extension 215 at one axial end of the base plate 212. The base plate 212 extends in an axial direction Z and has a width slightly wider than the width of a seat belt webbing 238. The base plate 212 has at least one mounting hole 280 for anchoring the pretensioner device 210 on a part of a vehicle structure.

On the two lateral sides of the base plate 212, the side rails 272 extend in the axial direction Z perpendicular to the base plate 212. The side rails 272 each have an inward-bent rim 273 formed along their longitudinal edges opposite the base plate 212. The rims 273 support a backing plate 213 having a central section 282 that extends parallel to the base plate 212 with two laterally spaced arms 284 embracing the side rails 272 and fastened to the frame 211 by a bolt 286 that extends through the entire width of the frame from one side rail 272 to the other. An attachment bar 250 for attaching the belt webbing 238 is formed on the backing plate 213.

Between the side rails 272, the bolt 286 is guided through a closed end portion 288 of a cylinder 232. The cylinder 232 has a hollowed end 233 facing the extension 215 of the frame 211. A slide 240 has an end portion forming a semicylindrically shaped actuating profile 242 adapted to abut a belt webbing 238. From FIG. 7, it is evident that the slide 240 has a substantially rectangular cross-section in a plane perpendicular to the longitudinal direction Z. The rectangular cross-section is dimensioned to be guided along the longitudinal direction Z in the frame 211 between the side rails 272 in one radial dimension and between the base plate 212 and the rims 273 in the other radial dimension. A cylindrical cavity 244 inside the slide 240 is configured to receive the cylinder 232. The cylinder 232 is sealed against the cylindrical cavity 244 to reduce gas leakage during deployment of the gas generator 220.

Near the actuating profile 242, the slide 240 has a radially opening receptacle 271 for receiving a gas generator 220. At least the one of the side rails 272 that is located on the side of the gas generator 220 has an axial slot 274 that is dimensioned to allow the gas generator to be connected to an electronic control unit and to allow the slide 240 to move in the axial direction Z upon deployment of the gas generator 220.

The side rails 272 each have an angled slot 290 near their ends axially opposite the extension 215. The orientation of the angled slots 290 places the slots at a farther distance from the base plate at their ends proximate the extension 215 than at their opposite ends. An exemplary range of the angle α between the angled slots and the base plate is 20° to 45°. A locking wedge 266 has two sliding tabs 292 that penetrate the angled slots 290 and are slidable along the angled slots 290. The sliding tabs 292 have an elongated profile extending in a direction coinciding with the orientation of the angled slots 290 so that the locking wedge 266 cannot rotate in the angled slots 290 and can only a linear movement along the angled slots 290. The angled slots 290 accordingly operate like a ramp for the sliding tabs 292 moving the locking wedge 266 close to the backing plate 212 when the sliding tabs travel along the angled slots 290 to the left in the shown perspective and moving the locking wedge 266 away from the backing plate 212 when the sliding tabs 292 travel in the opposite direction.

The locking wedge has two operational surfaces 267 and 269, of which one toothed surface 267 extends parallel to the base plate 212 and is configured to interact with the belt webbing 238 depicted in FIG. 6.

Figure 9:
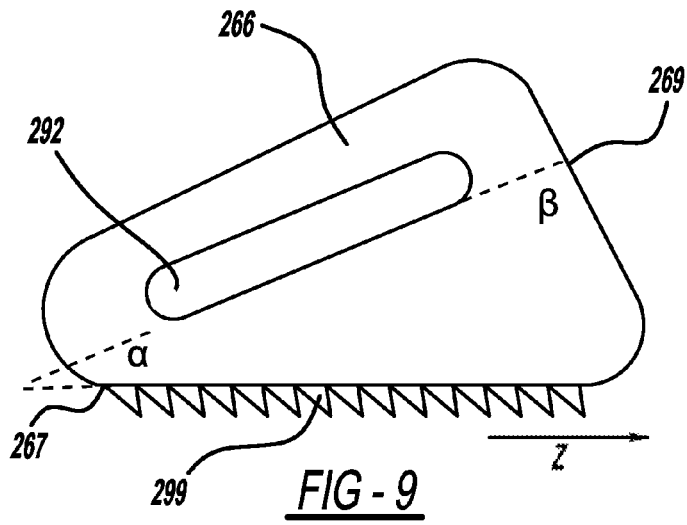
FIG. 9 shows a detail view of the PLP of FIG. 5.
Figure 10:
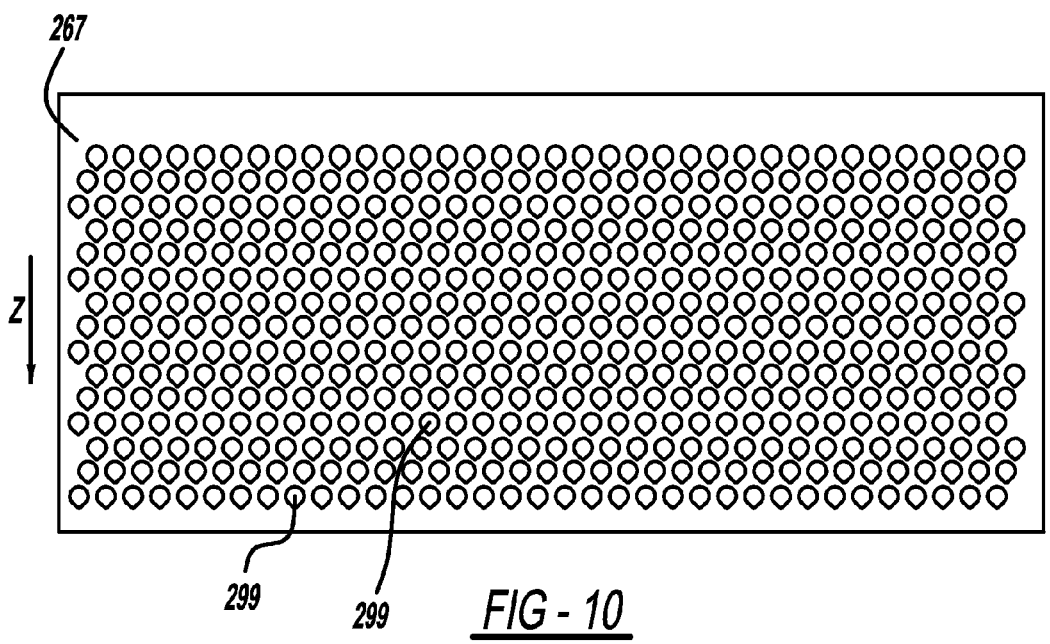
FIG. 10 shows a further detail view of the PLP of FIG. 5.

Referring now to FIGS. 9 and 10, the toothed surface 267 has slanted teeth 299 that extend downward and toward the extension 215. The teeth 299 are arranged in a sense pattern promoting engagement of the teeth with the belt webbing 238. The angle of the slanted teeth 299 allows a relative movement of the belt webbing 238 toward the extension 215, but not in the opposite direction. Furthermore, a pulling force exerted on the belt webbing 238 opposite to the axial direction Z causes the toothed surface 267 to be moved closer to the belt webbing 238 because the belt webbing 238 engages the toothed surface 267 and moves the locking wedge 266 along so that the sliding tabs 292 travel along the angled slots 290 toward the belt webbing 238. This results in an additional radial force locking the teeth 299 of the toothed surface 267 in the material of the seat belt webbing 238. Accordingly, this arrangement forms a one-way clutch through the interaction of the toothed surface 267 with the belt webbing 238 through the ramp function performed by the angled slots 290 and the sliding tabs 292.

The other operative surface of the locking wedge 266 is an abutment surface 269. The abutment surface 269 is slanted with respect to the base plate. The abutment surface 269 is arranged adjacent to an end surface 294 of the cylinder 232 that is configured to support the locking wedge 266 when the sliding tabs 292 of the locking wedge 266 have reached the ends of the angled slots 290 proximate the cylinder 232. The angle β between the abutment surface 269 and the orientation of the angled slots 290 may be a right angle or may be in the range of 60° to 120°. The angle is chosen for an effective abutment of the wedge on the cylinder 232.

The belt webbing 238 enters the pretensioner device 210 between the base plate 212 and the toothed surface 267 of the locking wedge. The belt webbing 238 is further guided along the base plate 212 and wrapped around the actuating profile 242, thereby being deflected by nearly 180°. From the actuating profile, the belt webbing 238 extends to the attachment bar 250 on the backing plate, on which the belt webbing 238 is fastened, for instance by threading the belt webbing 238 around the attachment bar 250 and securing the end with a seam. Other fastening options include a bead securing the end of the belt webbing 238 in a slot. In a variation of the shown embodiment, the belt webbing 238 is not fastened to the attachment bar 250 and threaded through an opening 251 formed between the attachment bar 250 and the backing plate 213 to enable a variable positioning of the pretensioner device 210 in a vehicle. The attachment bar 250 or the opening 251 on one side and the locking wedge 266 cooperating with the base plate 212 on the other side form a guide arrangement for the belt webbing 238. As will be described in the following, the length of the seat belt webbing 238 received by the guide arrangement increases upon deployment of the gas generator 220.

The pretensioner device 210 includes an optional leaf spring 288 between the abutment surface 269 of the locking wedge 266 and the cylinder end surface 294 for noise reduction when the gas generator 220 deploys. An optional preassembly hook 296 on the cylinder end portion 288 is configured to snap into a corresponding recess or hole 298 on the slide 240. The preassembly hook 296 is dimensioned to withstand only a small pulling force so that it releases the slide 240 upon deployment of the gas generator 220.

The pretensioner device 210 operates as follows: upon sensing or anticipating an impact or a vehicle rollover, an electronic control unit (not shown) sends a trigger signal to the gas generator 220. The gas generator 220 deploys and generates a gas pressure that travels through the actuating profile 242 into the cylindrical cavity 244 and the hollowed end 233 of the cylinder 232. The pressure inside the cylinder 232 exerts an axial force in the direction Z on the slide 240, thereby moving the slide 240 and the actuating profile 242 in the axial direction Z. The preassembly hook 296 releases the slide 240 under the generated pressure force. As the actuating profile 242 moves toward the extension 215, the belt webbing 238 is pulled into the pretensioner device 210 by a length that is approximately twice the travel of the movement of the actuating profile 242. If no opposing force is exerted on the belt webbing, the travel of the actuating profile 242 ends when the belt webbing wrapped around the actuating profile abuts the extension 215. The extension 215 determines the maximum stroke of the slide 240.

A pulling force on the belt webbing 238 opposite to the axial direction Z stops the slide travel if the pulling force is equal to or exceeds the force generated by the gas pressure on the slide 240. The pulling force, however, is eventually blocked from pulling the belt webbing 238 back out of the pretensioner device 210 due to the teeth 299 arranged on the toothed surface 267 engaging the belt webbing 238. Any outward movement of the belt webbing 238 from the pretensioner device 210 stops when the locking wedge 266 has reached a locked position from which the locking wedge cannot move any farther outward from the pretensioner device 210. Depending on the thickness of the belt webbing 238 and the distance of the angled slots 274 from the belt webbing 238, the locking position is reached when either the toothed surface 267 presses against the belt webbing 238 on the base plate 212 or when the sliding tabs 292 have reached the outward ends of the angled slots 290.

The foregoing description of three embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. Such modifications include combinations of details disclosed in different embodiments. All such modifications and variations are within the scope of the invention as determined by the appended claims when interpreted in accordance with the breadth to which they are fairly, legally, and equitably entitled.

The invention claimed is:

1. A linear pretensioner for use as part of a motor vehicle seat belt restraint system of the type mountable to a motor vehicle structure and acting on a seat belt, the pretensioner upon being activated, pretensioning the seat belt to reduce slack in the seat belt, the linear pretensioner comprising:
   a frame configured to be fastened to a vehicle;
   a body rigidly connected to the frame, the body including
      an axial cavity having one axial end formed by a movable closure and one fixedly closed axial end;
   an actuating assembly arranged to seal the axial cavity and
      to slide relative to the body in an axial direction, thereby forming the movable closure and expanding the axial cavity, the actuating assembly including an actuating profile movable with the actuating assembly in the axial direction along an actuation path;

a gas generator in fluid communication with the axial cavity and configured to generate a gas pressure in the axial cavity that causes the actuating assembly to slide in the axial direction;

a guide arrangement configured to receive a length of belt webbing being a part of the seat belt restraint system, the length of belt webbing being guided with respect to the frame in a manner that the belt webbing extends around the actuating profile and crosses the actuation path, the actuating profile being configured to abut the length of belt webbing and to lengthen the length of belt webbing received by the guide arrangement upon deployment of the gas generator by axially moving the belt webbing within the guide arrangement along the actuation path so as to shorten the length of the seat belt outside the guide arrangement, the pretensioner device having a locking ramp arrangement configured to form a one-way clutch allowing an increase of the length of belt webbing received by the guide arrangement and resisting a reduction of the length of belt webbing received by the guide arrangement, wherein the locking ramp arrangement comprises two angled slots on the frame, the angled slots forming a ramp, and a locking wedge having two sliding tabs configured to slide in the angled slots, in a manner allowing a movement of the belt webbing into the guide arrangement and resisting a movement of belt webbing out of the guide arrangement.

2. The pretensioner of claim 1, further comprising that the locking wedge has a toothed surface extending parallel to the belt webbing and having a plurality of slanted teeth configured to engage the belt webbing during a movement of the belt webbing outward from the guide arrangement.

3. The pretensioner of claim 1, further comprising that the gas generator is connected to the actuating profile and movable therewith, and that a fluid connection through the actuating profile connects the axial cavity with the gas generator.

4. The pretensioner of claim 3, further comprising that the frame has an axially extending opening for electrical conductors leading from the gas generator to an electronic control unit.

5. The pretensioner device of claim 1, wherein the axial cavity is formed by a cylinder and the actuating assembly comprises a piston slidably arranged in the cylinder.

6. The pretensioner of claim 5, wherein the actuating profile is formed as a part of the piston.

7. The pretensioner of claim 5, wherein the actuating profile is a separate part connected to the piston.

8. The pretensioner of claim 1, wherein a travel of the actuating profile along the actuation path by a distance lengthens the length of the seat belt webbing received by the guide arrangement by twice the distance.

9. The pretensioner of claim 1, further comprising that the actuating assembly has axial guide elements configured to guide the actuating profile along the actuation path.

10. The pretensioner of claim 1, wherein at least a portion of the axial cavity is formed by a cylinder partially inserted into a block.

11. The pretensioner of claim 10, wherein the cylinder is made of metal.

12. The pretensioner of claim 10, wherein the block is made of metal and comprises a bore forming a part of the axial cavity.

13. The pretensioner of claim 10, further comprising an axial collar formed on the block, the axial collar being crimped or caulked to axially secure the gas generator inside the axial cavity.

14. The pretensioner of claim 1, wherein the guide arrangement comprises a slot on one radial side of the frame and an attachment bar on a radially opposite side of the frame.

15. A pretensioner for use as part of a motor vehicle seat belt restraint system of the type mountable to a motor vehicle structure and acting on a seat belt, the pretensioner upon being activated, pretensioning the seat belt to reduce slack in the seat belt, the pretensioner comprising:

a frame configured to be fastened to a vehicle;

a gas generator configured to generate a gas pressure upon receiving an electronic trigger signal;

an actuating assembly configured to be operated by the gas pressure generated by the gas generator and to pull a length of a seat belt webbing into the frame; and a locking ramp arrangement acting on the seat belt webbing, configured to form a one-way clutch allowing movement of the seat belt webbing into the frame and resisting a movement of the seat belt webbing out of the frame, wherein the locking ramp arrangement comprises two angled slots on the frame, the angled slots forming a ramp, and a locking wedge having two sliding tabs configured to slide in the angled slots, in a manner allowing a movement of the belt webbing into the guide arrangement and resisting a movement of belt webbing out of the guide arrangement.

* * * * *